July 18, 1933.  W. PONTOW ET AL  1,918,424
FLUID OPERATED CONTROL DEVICE
Filed Jan. 26, 1932  4 Sheets-Sheet 1

Inventors
Werner Pontow,
Wilhelm Abendroth,
Günther Schroeder,
Karl A. Mayr
by Knight Bros
attorneys.

Patented July 18, 1933

1,918,424

UNITED STATES PATENT OFFICE

WERNER PONTOW, OF BERLIN-WILMERSDORF, WILHELM ABENDROTH AND GÜNTHER SCHROEDER, OF BERLIN-CHARLOTTENBURG, GERMANY, AND KARL A. MAYR, OF NEW YORK, N. Y., ASSIGNORS TO SIEMENS-SCHUCKERTWERKE AKTIENGESELLSCHAFT, OF BERLIN-SIEMENSSTADT, GERMANY, A CORPORATION OF GERMANY

FLUID OPERATED CONTROL DEVICE

Application filed January 26, 1932, Serial No. 589,034, and in Germany January 28, 1931.

Our invention relates to a fluid operated control device, and more particularly to a control device for automatically controlling and maintaining in a power system a desired magnitude of a condition, such as fluid pressure, temperature, volume at that desired value.

The invention proposes to employ a pilot device involving a hydraulic follow-up and return feature which is provided with a retarding element, such as an oil brake, and combined with an auxiliary power accumulator, such as a spring. In particular these novel features operate in such manner that the pilot elements which initiate the control operation of the main control element for the main power system, return to their normal position after each regulating cycle, independent of the position which the main control element may have assumed after it has been actuated.

One of the essential advantages of such an arrangement is, that the driving motor for the main control element—for instance the main regulating valve in a steam generating system—may be located any desired distance away from the pilot device. The follow-up and return mechanism is actuated in such a system either by an entirely separate servo-motor or indirectly by the driving motor for the main control element. One of the important features in this auxiliary system involves the novel construction and actuation of the fluid brake, the essential novelty of which consists in suplying a control fluid underneath the piston of the brake during the charging of the power accumulator, and in an arrangement of the associated elements so that after each regulating cycle the brake piston and cylinder resume their initial normal relative position.

The advantages which flow from such an arrangement are as follows:

In the prior art regulating arrangements the movements of the brake element must always be proportionate to the movements of the power element (such as a servo-motor piston) which operates the main control element, since both elements can travel only through a limited range. If this proportionality should be disturbed, one of these elements would reach the end of its path sooner than the other element. From this necessary requirement of proportionality it follows that in such prior art regulating devices it is possible to mount the return control and pilot device, especially the fluid brake, remote from the main control motor only if provisions are made for transmitting the main motor movements proportionately and positively to the device which varies the piston position of the fluid brake, which naturally would lead to very complicated distant control devices. Such provisions are not necessary in the arrangement according to the present invention, in which the fluid brake piston can never reach a limit position in which the motor which actuates the main control element is prevented from further operation.

Aside from these features the device according to the present invention involves a number of additional advantages over the prior art pilot devices of this type, which will appear from the following description.

In an electrically actuated control device constructed in accordance with our invention, the follow-up movement imparted to the contact blade holder of the pilot device through a system of levers is brought about by the action of a fluid circulating in a closed auxiliary fluid system, whereby the aforesaid drawback is prevented.

Although our invention primarily features an electrical control device, the moving parts of which are utilized to control the direction of rotation of parallel-connected motors controlling a regulating member to maintain in a pressure system normal working conditions, we do not desire our invention to be limited to such an electrically operated indicating device. Our invention is equally applicable to a mechanically operated control device such as hereinafter described and illustrated.

In the drawings, in which like reference numerals denote like parts, Figure 1 shows a front elevation partly in section of a control device in which the contact blade holder of the pilot system is provided with two contact blades, whereas Figures 3 and 4 are the respective plan views of the control apparatus of Figs. 1 and 2 showing the arrangement of the system of levers.

Figures 1, 3:
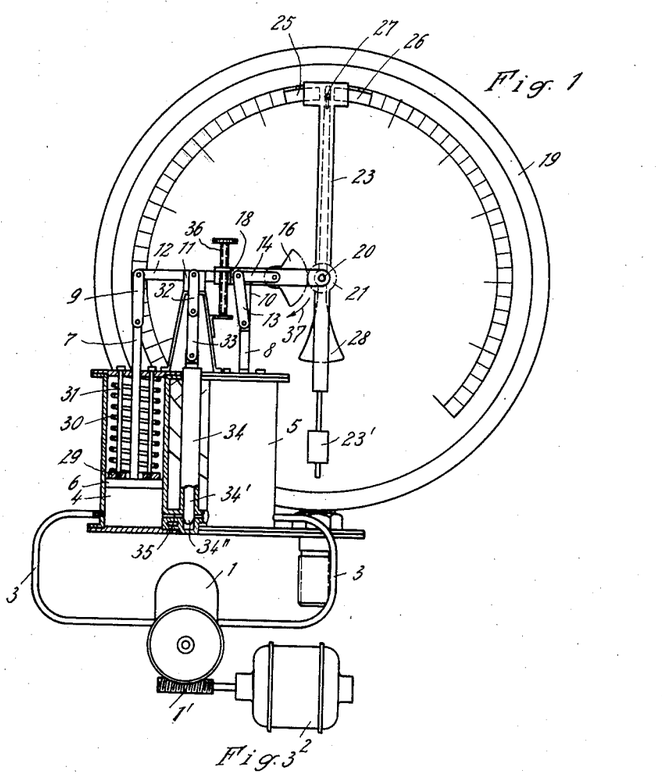

Referring to Figure 1, the gear pump 1, coupled to the motor 2 through the worm gear 1', forces oil through the conduit 3 from the cylinder 4 into the cylinder 5 or vice versa depending upon the sense of rotation of the motor 2, whereupon the pistons 6 will operate in opposite directions. The pistons 6 are connected by their respective piston rods 7 and 8 and connecting rods 9 and 10 to the two-armed lever or balancing beam 12, pivotally mounted on a stationary support 11 so as to present at both sides equal arms. The link 13 is pivotally attached to the piston rod 8, the upper end of the link 13 being pivotally connected to the lever 14 which, in turn, is rigidly attached to the toothed segment 16. The latter is journalled on to the control lever 18 by the pivotal axle 16', and meshes with the pinion 21, the control lever 18 being so mounted as to permit it to swing about the extension of the axis 20 of the pointer 28 of the indicating device 19, the pinion 21, in turn, being rigidly fixed to a contact carrier 23 which is thus operated by the system of levers 12, 13, 14, when balancing beam 12 rocks. Indicating device 19 may in the present example indicate by pointer 28 the pressure of the system to be controlled. This pointer or indicator with its contact bead 27 is referred to in the annexed claims as the "pilot element". Contact carrier 23 is provided with two contact blades or plates 25 and 26 termed in the claims the "cooperating elements", between which the contact bead 27 of highly refractory material, such as molybdenum, plays, and which is disposed on a resilient blade welded to the pointer 28. Contact carrier 23 is balanced by a counter weight 23'. The pistons 6, of which only that of cylinder 4 is visible, are normally held in contact with the spring discs 29 by means of the springs 30. The downward movement of the discs 29 is limited by the rods 31, the length of which is so dimensioned that when both pistons 6 are at the same height, the spring discs 29, assume their lowermost position, and rest on the pistons 6 so that the springs 30 always tend to maintain the lever 12 in the horizontal position. The lever 32 is rigidly fixed to the lever 12 at right angles to it, and is connected to the valve 34 by means of connecting rod 33. The plunger 34' is provided at its lower end with a tapered portion 34'', and varies according to its position, the sectional area of flow of the equalizing passage or duct 35 leading from the cylinder 4 to the cylinder 5. These cylinders are filled with oil to about two thirds of their capacity, whereas duct 35, the conduit 3 and the geared pump 1 are completely filled. The position of the control lever 18 may be altered with the aid of the adjusting screw 36.

The operation of the device is as follows: The contact carrier 23 co-operating with the system of levers 9, 12, 18 etc. indicates on the scale of the indicating device 19 the desired normal fluid pressure of the system to be supervised, which pressure should be maintained at that value. The contact blades 25 and 26 are spaced from each other so as to provide for a permissible pressure-variation range. Should the pressure in the pressure system be below or above the normal value, indicator arm 28 responds and its contact bead 27 will come into engagement, for instance, with the contact blade 26, thus causing a circuit to close, thereby operating a contactor through a control relay so as to connect a control motor in the desired direction to actuate the main control element such as a valve, rheostat or switch, by which the normal condition of the power system is restored. As the motor 2 for operating oil pump 1 is assumed to be parallel-connected to the aforementioned control motor, oth motors will be switched in circuit at the same time.

Figure 5:
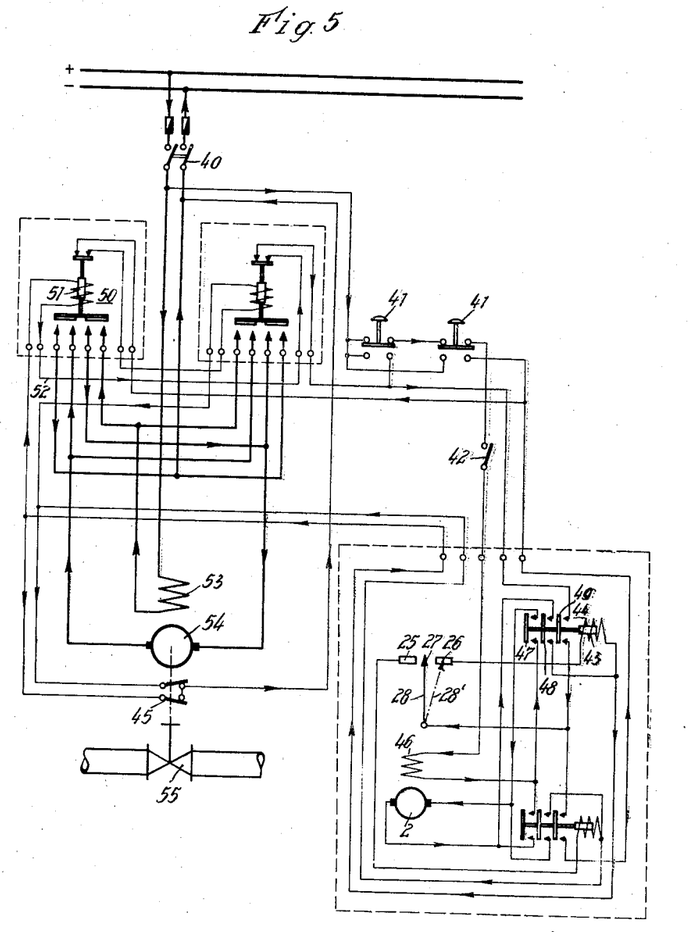
Figure 5 is a diagrammatic view of the circuit for controlling the direction of rotation of the motor for controlling the main regulating member for the power system.

The operation of such a device will best be understood by reference to the diagram of connections shown in Figure 5.

As will be seen from the Figure 5, the pointer 28 of the indicating device is shown in its normal position. In the event of the pressure being below or above its normal value, the contact bead 27 of the pointer 28 will come into engagement, for instance, with the contact blade 26, thus causing a circuit to close and the motor 2 to rotate in one direction. The current flows in the closed circuit as indicated by the arrows, i. e. from the positive conductor of the supply circuit through the switch 40, both push buttons 41, the closed switch 42, through the pointer 28' shown in dashes, through the coil 43 of contact relay 44 which closes its contacts, thence through the end switch 45 to the negative conductor of the supply circuit. At the same time, the current flows by way of the field-magnet winding 46 of motor 2, left contact 47 of relay 44, rotor of the motor 2, intermediate contact of relay 44, coil 51 of the contactor 50, wire 52 to the right contact 49 of the contactor 44, the pointer 28', and as previously traced back to the negative conductor of the supply circuit. And as the system is alive for rotating the motor 2 in one direction, and switch 50 being closed, the supply circuit will energize the field-magnet winding 53 of the control motor 54 which is assumed to rotate in the same direction and controls the valve 55 of the assumed power fluid supply system so as to maintain normal operating pressure conditions in the power fluid system. Should the pointer 28 come into engagement with the contact blade 25, the motor 2, due to the connections shown will rotate in the reverse direction, which causes motor 54 to likewise rotate in reverse direction and to bring about reverse movement of valve 55.

Assuming that the indicator 28 with its contact bead 27 moves clockwise, due to its response to an abnormal pressure condition in the power fluid system which we take for the present example as being controlled by valve 55 in Fig. 5. The first thing which happens is that bead 27 makes contact with blade 26, thereby closing the circuits shown in Fig. 5 and previously described, and thus motors 2 and 54 are set running. Assume further the sense of rotation of motor 2 in that case such that the gear pump 1 in Fig. 1 forces the oil from the cylinder 5 into the cylinder 4. In that case the piston 6 of the cylinder 4 will move upwardly, whereas that of the cylinder 5 moves downwardly a corresponding amount. The connecting rod 13 pivotally mounted on the piston rod 8 then moves the lever 14 rigidly fixed to the toothed segment 16 in the downward direction, counter to the arrow 37, and segment 16, thereby rotating counterclockwise, actuates the contact holder 23 through the pinion 20 in clockwise direction, following indicator 28 to break the contact between the blade 26 and the bead 27 previously made. When this happens contact relay 44 in Fig. 5 is deenergized, and the motor for controlling the valve 55 as well as motor 2 of pump 1 are set at rest, whereupon the supply of oil to cylinder 4 ceases. The previously mentioned rise of oil in cylinder 4 compresses spring 30 which now returns the lever 12 to its horizontal position, thereby returning piston 6 of cylinder 4 gradually to the position shown. This is possible because the surplus quantity of oil previously delivered by pump 1 into cylinder 4 gradually passes through duct 35 which is then open, because lever 12, on assuming an inclined position in either direction, moves the plunger 34' upwardly. Normally, i. e. when balancing beam 12 is horizontal, plunger 34' is in its lowermost position and thereby completely obstructs the passage 35. If the lower end of the plunger is so disposed with respect to duct 35 that it just closes it when beam 12 is in horizontal position, the equalization through the duct will be quite freely upon relatively slight angular movements of beam 12. If on the other hand plunger 34' in normal position extends a certain distance beyond duct 35, and its diameter is slightly restricted at its end as shown at 34'', beam 12 must tilt through quite an angle before the equalizing passage is opened to any appreciable extent. This has the effect of slowing down the return movement of the contact carrier to a considerable extent, especially near the normal position of beam 12. By properly dimensioning the relative lengths of connecting rod 33 and arm 32, and the shape of the plunger end, the proper speed of return movement may be attained for a given device to fit the character of the power system to be controlled.

This retarded return of the contact carrier is desirable in order to leave sufficient time for the regulating motion of the main control element, such as valve 55, to take effect, for instance in the present case for the pressure system controlled by it to restore its normal condition, so that the indicator 28 can return to the position shown in Fig. 1. In other words if the contact carrier 23 arrives too early at the zero position shown, blade 26 will overtake bead 27 on its counterclock movement, and another contact will occur which may not be desired and which would start the motors again, and which thus may cause overregulation. After the equalization of the oil is completed, beam 12 arrives at its horizontal position and piston 6 also assumes its normal position, thus returning contact holder 23 to its normal position. Should indicator 28 respond in counterclockwise direction to abnormal conditions of the controlled system, the bead contacts with blade 25. The motors are started in the opposite direction, and motor 2 causes oil to be now supplied from cylinder 4 to the cylinder 5 by the gear pump 1 through the conduit 3. Thus a pressure is exerted on the underside of the pertaining piston 6 causing the latter to move upwardly and the segment portion 16 to rotate by means of the system of levers 9, 12, 18 etc. in the direction of the arrow 37 so that the contact carrier 23 will move in a counterclock sense. At the same time plunger 34' again opens passage 35 to an extent commensurate with the piston movement. The pointer 28 with its contact bead 27 will follow the pointer 23 until, and depending upon the conditions of the fluid pressure to be controlled, the contact between the contact holder 23 and the bead 27 is broken, inasmuch as the contact holder 23 travels at a greater speed than the pointer 28. The control exerted upon the power system gradually taking effect, indicator 28 will gradually return to normal position in clockwise direction. Since now the liquid equalization between the two cylinders through passage 35 starts in the manner described, balance beam 12 gradually returns to its horizontal position and thereby gradually returns contact carrier 23 to normal position without causing a contact with bead 27. As previously stated, by changing the lengths of the valve lever 32 and of connecting rod 33, it is possible to vary to any desired extent the speed of the contact holder 23, to adapt it to the time which it takes the power system to recover from a regulating cycle. Should but one engagement of the bead 27 of instrument pointer 28 with one of the two contact blades be sufficient to regulate the power system back to the desired normal condition, the regulating action is then terminated. If the power system hesitates in its response, indicator 28 will likewise hesitate to return to normal position, and then its bead 27 will be overtaken by the returning carrier plate with which it was previously in contact, and another regulating cycle will be initiated. This operation is repeated as often as is required to attain the normal condition. However, if in the case of sudden fluctuations of the power system to be controlled, for instance in the present case of the pressure, the pointer 28 should continue to follow the scale in the one or other direction as the case may be, for instance clockwise, contact blade 26 in its attempt to return to normal position will soon again contact with bead 27. These temporary engagements if repeated several times cause the angle of inclination of the lever 12 to increase, thereby increasing by means of the plunger 34' the opening of the passage 35. The interval between one contact cycle and the next following, during which the same blade of carrier 23 comes again into engagement with the contact bead 27 becomes shorter and shorter as a result of the rapid equalization of the quantity of oil, until the amount of oil flowing through the passage 35 is equal to the delivery of the gear pump 1. At this moment beam 12 stops tilting further, and thus carrier 23 stops following indicator 28 to the right, thereby establishing for the time being a permanent contact engagement. Consequently the time period during which the control motor 54 is in operation increases in direct proportion to the departure of the power system pressure to be controlled from the normal value. This gives motor 54 ample time to regulate valve 55 long enough and far enough independently of further movements of the pilot system to restore normal conditions.

For adjusting the aforedescribed pilot system to different "normal" values adjusting screw 36 is employed by means of which the control lever 18 may be swung about the axis 20 into different radial positions thereby shifting the center of rotation of the toothed segment 16 by which the normal position of contact carrier 23 on the instrument scale is determined. With the arrangement shown the adjustment may be made within a wide range.

If it should happen that the permissible operating range of the steam pressure to be controlled fluctuates within wide limits, it may occur that the follow-up movement of the contact carrier by means of the system of levers 12, 13, 14 is not fast enough for the closeness of the contact blades 25 and 26. In its endeavor to follow the widely varying pointer 28, it would in escaping contact by one of its blades with bead 27, make contact at the other contact blade, thereby causing a permanent hunting action. It is, therefore, of advantage to arrange for a separate movement of the contact blades 25 and 26 with the aid of two contact blade holders 23 and 24, so that only the contact blade for the desired control direction moves from normal position to follow the indicator, and cooperates with the latter's contact bead 27, whereas the other contact holder remains in its normal position.

Figure 2:
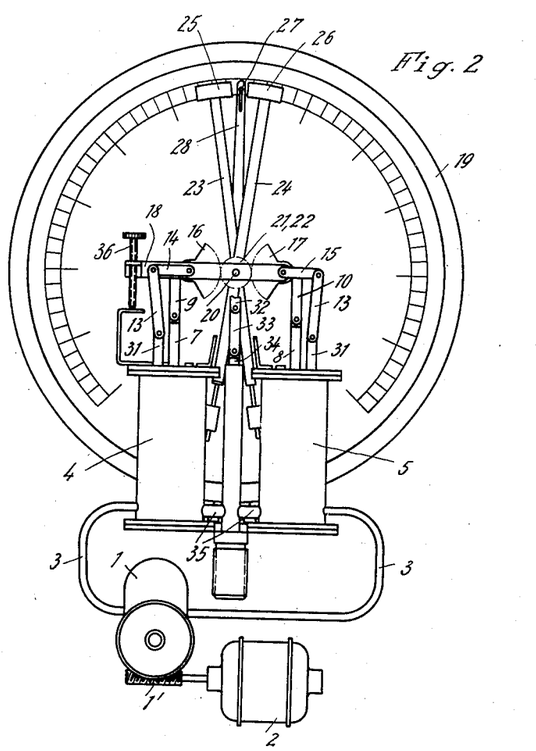
Figure 2 shows an arrangement in which these blades are separated and carried by two independent contact holders, each of which may come into engagement with the contact of the pointer of the indicating device.
Figure 4:
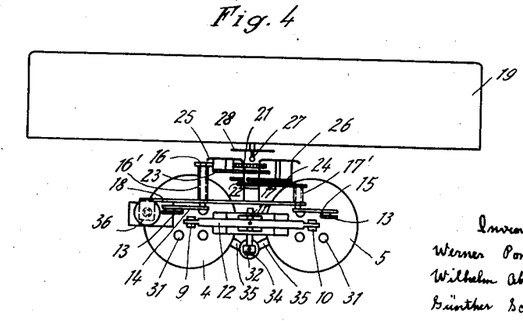

An arrangement of the above-mentioned type is shown by way of example in Figures 2 and 4. The fundamental design is substantially the same as that shown in Figures 1 and 3. As will be seen from Figure 2, the connection of the piston rods 7 and 8 through the connecting rods 9 and 10 and to lever 12 as well as the parts inside of the cylinders 4 and 5 may be the same as those disclosed in Figures 1 and 3. But in this case two contact carriers 23 and 24 are provided, each having a pinion 21 and 22 respectively, meshing with the appertaining toothed segments 16 and 17 actuated respectively by the levers 14 and 15, and by connecting rods 13 which latter are pivotally attached to the guide rods 31, each of which latter is attached to the spring disk 29 of one of the cylinders 4 and 5 (Fig. 1). The segments 16 and 17 as Fig. 4 shows, lying in different planes are journalled in the common control lever 18, the latter being pivoted midway between its ends so that it can swing about the axis 20. As in Fig. 1 it is adjustable in different angular positions by means of adjusting screw 36.

The operation of this arrangement is similar to that of the arrangement shown in Figure 1. The left-hand contact carrier 23 cooperating with segment 16 is controlled by the lever gear 31, 13, 14 from the spring disk of cylinder 4 (not shown) and the right-hand contact holder 24 is similarly controlled by the spring disk 29 of cylinder 5 (also not shown). Should the contact bead 27 come into engagement with the contact blade 25, the gear pump 1 will operate similar to the arrangement shown in Figures 1 and 3, and will deliver the oil from the cylinder 5 to the cylinder 4. The piston 6 of the cylinder 4 will raise the corresponding spring disc 29 which moves the connecting rod 13 through the guide rod 31, and the toothed segment 16 actuates the contact holder 23 counterclockwise so as to break the contact between the contact plate 25 and bead 27. As the spring disc 29 of cylinder 5 remains at rest during this period, also the contact blade 26 will remain in its initial position. Similarly contact blade 25 remains at rest, when bead 27 contacts with blade 26, and the latter is operated counterclockwise by segment 17.

Figure 6:
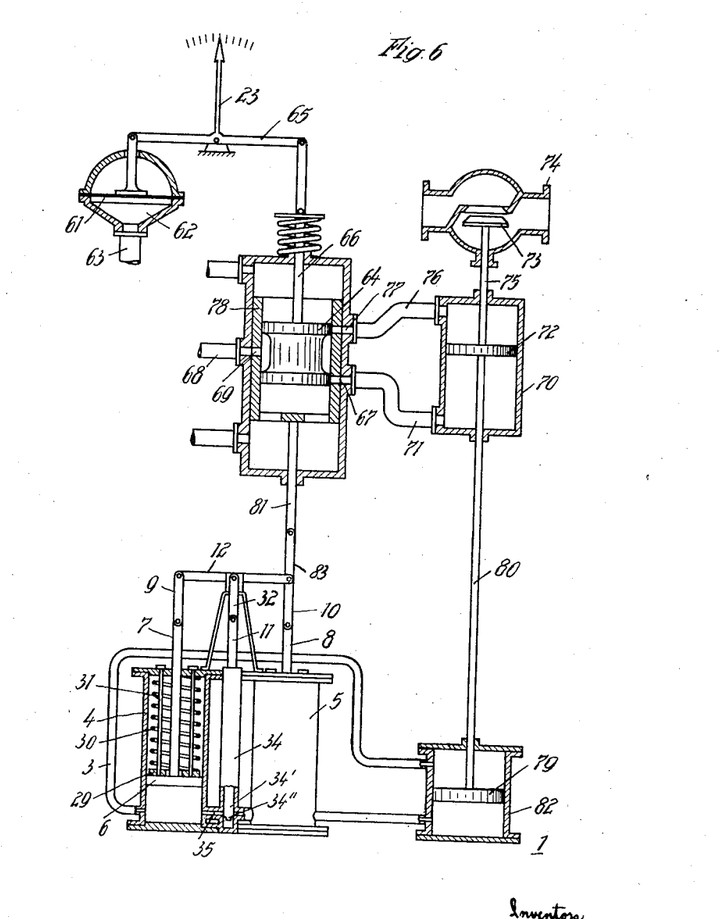
Figure 6 is a modified form of construction showing the arrangement of a mechanically operated control apparatus.

Figure 6 shows an arrangement in which the control device is mechanically operated. The operation is as follows:

Assuming that the pressure in the pressure system to be controlled exceeds the normal value so as to move the pointer 23 of the pressure indicating device in the clockwise direction through the upward bending of diaphragm 61 disposed in the pressure chamber 62 connected through the pipe 63 to the pressure system. This will cause the piston valve 64 to move in a downward direction through the two-armed lever 65, valve rod 66, whereupon the inlet port 67 opens to allow the oil flowing from the oil pump (not shown) through the pipe 68 and through the port 69 into the annular space about the piston 64, to pass into the cylinder 70 through the conduit 71. The oil, exerting a pressure on the underside of the piston 72, will cause the latter to be operated in an upward direction, and as the disc 73 of the valve 74 is rigidly connected to the piston 72 through the rod 75, it will approach its closing position. During the upward movement of the piston 72, the oil contained in the upper portion of the cylinder 70 will be forced through the conduit 76 and the port 77 into the space above the piston 64 surrounded by the sleeve 78.

At the same time, the piston 79 of cylinder 1, being rigidly connected to the piston 72 through the rod 80 forces the oil into the cylinder 4 through the conduit 3 to cause an upward movement of the piston 6 of that cylinder, thereby causing the lever 12 to assume an inclined position whereby piston rod 81 of the sleeve 78 connected through connecting rod 83 with lever 12, is moved in a downward direction. The passage of the oil into the conduit 71 being thus obstructed, the pistons 72 and 79 of the respective cylinders 70 and 82 are brought to rest so that the quantity of oil in both cylinders 4 and 5 will be gradually equalized through passage 35, as described in the arrangement of Figure 1 whereby the sleeve 78 returns to its initial normal position, as soon as lever 12 resumes its horizontal position.

In the event of the pressure in the power system not returning to normal in the meantime so that piston 64 has not returned to its initial position as soon as the sleeve has been operated in an upward direction in the manner just described, oil is again supplied through duct 71 into cylinder 70 and the cycle of regulating operations is repeated as above described. If diaphragm 61 bends through in a downward direction, the reverse cycle of operation occurs, which opens valve 74 further.

Equivalent modifications and changes in the mechanism may be made without departing from the spirit and scope of our invention.

We claim as our invention:

1. In a control system for controlling the movement of objects in two directions through power circuits, in combination with a pilot element, responsive in two directions to the requirements for control and two cooperating elements, one for each control direction, and means for energizing the power circuit by engagement between the pilot element and one or the other of said cooperating elements according to the desired direction of movement of the object when its control is required, of a closed auxiliary fluid circulating system and a pump therefor, operable simultaneously with said object, for circulating fluid in one or the other direction in accordance with the direction of movement of said object, a hydraulic servomotor system connected to the two sides of said circulating system, and actuated by the fluid therein for moving the cooperative element, engaged by said pilot element, from its normal position in the direction of response of the pilot element, to disengage said two latter elements, and retarded means actuated by the operation of said servomotor system for returning said cooperative element, when disengaged, to its normal position.

2. In a control system for controlling the movement of objects in two directions through power circuits, in combination with a pilot element, responsive in two directions to the requirements for control and two cooperating elements, one for each control direction, and means for energizing the power circuit by engagement between the pilot element and one or the other of said cooperating elements according to the desired direction of movement of the object when its control is required, of a closed auxiliary fluid circulating system and a pump therefor, operable simultaneously with said object, for circulating fluid in one or the other direction in accordance with the direction of movement of said object, a hydraulic servomotor system connected to the two sides of said circulating system, and actuated by the fluid therein for moving the cooperative element, engaged by said pilot element, from its normal position in the direction of response of the pilot element, to disengage said two latter elements, and a spring element tensioned by the disengaging operation of said servomotor, and means for connecting said spring element with said engaged cooperating element to return the latter, when disengaged from the pilot element, to its normal position, and means for retarding the action of said spring element.

3. In a control system for controlling the movement of objects in two directions through power circuits, in combination with a pilot element, responsive in two directions to the requirements for control and two cooperating elements, one for each control direction, and means for energizing the power circuit by engagement between the pilot element and one or the other of said cooperating elements according to the desired direction of movement of the object when its control is required, of a closed auxiliary fluid circulating system and a pump therefor, operable simultaneously with said object, for circulating fluid in one or the other direction in accordance with the direction of movement of said object, a pair of hydraulic servomotor cylinders connected to the two sides of said pump, and pistons in said cylinders displaceable in opposite direction from a normal position when the pump operates, a mechanical coupling element between said pistons, means for connecting said pistons and the cooperating contact elements for displacing with said pistons also at least the cooperative contact element, engaged by the pilot element, from its normal position in the direction of response of the pilot element, to disengage said elements, and a spring element connected to each piston and tensioned by the displacement of said pistons from normal position and tending to return said pistons to normal position, whereby said displaced cooperative element when disengaged from the pilot element is returned to normal position, and a fluid by-pass between said cylinders for permitting the return of said pistons to normal position, and means for controlling said by-pass for retarding said return.

4. In a control system for controlling the movement of objects in two directions through power circuits, in combination with a pilot element, responsive in two directions to the requirements for control and two cooperating elements, one for each control direction, and means for energizing the power circuit by engagement between the pilot element and one or the other of said cooperating elements according to the desired direction of movement of the object when its control is required, of a closely auxiliary fluid circulating system and a pump therefor, operable simultaneously with said object, for circulating fluid in one or the other direction in accordance with the direction of movement of said object, a pair of hydraulic servomotor cylinders connected to the two sides of said pump, and pistons in said cylinders displaceable in opposite directions from a normal position when the pump operates, a mechanical coupling element between said pistons, means for connecting said pistons and the cooperating contact elements for displacing with said pistons also at least the cooperative contact element, engaged by the pilot element, from its normal position in the direction of response of the pilot element, to disengage said element, and a spring element connected to each piston and tensioned by the displacement of said pistons from normal position and tending to return said pistons to normal position, whereby said displaced cooperative element when disengaged from the pilot element is returned to normal position, and a fluid by-pass between said cylinders for permitting the return of said pistons to normal position, and means controlled by the operation of said piston connecting means for controlling said by-pass for retarding said return.

5. In a control system for controlling the movement of objects in two directions through power circuits, in combination with a pilot element, responsive in two directions to the requirements for control and two cooperating elements, one for each control direction, and means for energizing the power circuit by engagement between the pilot element and one or the other of said cooperating elements according to the desired direction of movement of the object when its control is required, of a closed auxiliary fluid circulating system and a pump therefor, operable simultaneously with said object, for circulating fluid in one or the other direction in accordance with the direction of movement of said object, a pair of hydraulic servomotor cylinders connected to the two sides of said pump, and pistons in said cylinders displaceable in opposite direction from a normal position when the pump operates, a mechanical coupling element between said pistons, means for connecting said pistons and the cooperating contact elements for displacing with said pistons also at least the cooperative contact element, engaged by the pilot element, from its normal position in the direction of response of the pilot element, to disengage said element, and a spring element connected to each piston and tensioned by the displacement of said pistons from normal position and tending to return said pistons to normal position, whereby said displaced cooperative element when disengaged from the pilot element is returned to normal position, and a fluid by-pass between said cylinders for permitting the return of said pistons to normal position, and means for controlling said by-pass for retarding said return, and means for varying the normal position of said two cooperative elements.

6. In a control system for controlling the movement of objects in two directions through power circuits, in combination with a pilot element, deflectable in one or the other direction from a normal position according to the control direction required for said object, and two cooperative elements disposed on either side of said pilot element and individually engageable by the latter in accordance with the control direction required and means for energizing the power circuit by engagement between said pilot element and one of said cooperating elements to move the object in the desired direction when its control is required, of a closed auxiliary fluid circulating system and a pump therefor operable simultaneously with said object, for circulating fluid in one or the other direction in accordance with the direction of movement of said object, a pair of hydraulic servomotor cylinders connected to the two sides of said pump and pistons in said cylinder displaceable in opposite direction from a normal position when the pump operates, a coupling lever pivoted between its ends and connected at its ends to said pistons, a lever and gear connection between said pistons and both of said cooperating elements to move the latter from their normal position in one or the other direction according to the direction of displacement of said pistons, whereby the cooperative element engaged by the pilot element moves in the direction of the latter's deflection to disengage itself from the pilot element, and springs connected to said pistons and being tensioned by the displacement of said pistons and tending to return them to normal position, whereby said displaced cooperative elements when disengaged from the pilot element are returned to normal position, and a fluid by-pass between said cylinders for permitting the return of said pistons to normal position and a valve in said by-pass, controlled by the movement of said two armed levers for controlling said by-pass to retard the return of said cooperative elements to normal position.

7. In a control system for controlling the movement of objects in two directions through power circuits, in combination with a pilot element, deflectable in one or the other direction from a normal position according to the control direction required for said object, and two cooperative elements disposed on either side of said pilot element and individually engageable by the latter in accordance with the control direction required and means for energizing the power circuit by engagement between said pilot element and one of said cooperating elements to move the object in the desired direction when its control is required, of a closed auxiliary fluid circulating system and a pump therefor operable simultaneously with said object, for circulating fluid in one or the other direction in accordance with the direction of movement of said object, a pair of hydraulic servomotor cylinders connected to the two sides of said pump and pistons in said cylinder displaceable in opposite direction from a normal position when the pump operates, a coupling lever pivoted between its ends and connected at its ends to said pistons, a spring for each piston operatively connected with it to permit the displacement of said piston from normal position freely in one direction but to exert its spring power against the displacement in the other direction, a lever and gear connection between each cooperative element and one of said springs whereby each of said elements is displaced from normal position when its pertaining spring is compressed, for moving said element, when engaged by the pilot element, away from the latter, and for returning said disengaged element to normal position when the pertaining piston returns to normal position, and a fluid by-pass between said cylinders for permitting the return of said pistons to normal position and a valve in said by-pass, controlled by the movement of said two armed levers for controlling said by-pass to retard the return of said cooperative elements to normal position.

8. In a control system for controlling the movement of objects in two directions through power circuits, in combination with a pilot element, responsive in two directions to the requirements for control and two cooperating elements, one for each control direction, and means for energizing the power circuit by engagement between the pilot element and one or the other of said cooperating elements according to the desired direction of movement of the object when its control is required, of a closed auxiliary fluid circulating system and a pump therefor, operable simultaneously with said object, for circulating fluid in one or the other direction in accordance with the direction of movement of said object, a pair of hydraulic servomotor cylinders connected to the two sides of said pump, and pistons in said cylinders displaceable in opposite direction from a normal position when the pump operates, a mechanical coupling element between said pistons, a spring for each piston abutting at one end against the end of the pertaining cylinder, and having an abutment plate disposed between its free end and the piston, and movably arranged in the cylinder within a limited range to permit compression of the spring by the piston but to limit its expansion, means for connecting said pistons with said cooperating contact elements for displacing with said pistons at least the cooperative contact element, engaged by the pilot element, from its normal position in the direction of response of the pilot element, to disengage the cooperative element from the pilot element, each of said springs, when compressed by the displacement of its piston, tending to return both pistons to normal position, whereby said displaced cooperative element, when disengaged from the pilot element is returned to normal position, and a fluid by-pass between said cylinders, for permitting the return of said pistons to normal position, and means for controlling said by-pass for retarding said return.

9. In a control system for controlling the movement of objects in two directions through power circuits, in combination with a pilot element, deflectable in one or the other direction from a normal position according to the control direction required for said object, and two cooperative elements disposed on either side of said pilot element and individually engageable by the latter in accordance with the control direction required, and means for energizing the power circuit by engagement between said pilot element and one of said cooperating elements to move the object in the desired direction when its control is required, of a closed auxiliary fluid circulating system and a pump therefor operable simultaneously with said object, for circulating fluid in one or the other direction in accordance with the direction of movement of said object, a pair of hydraulic servomotor cylinders connected to the two sides of said pump and pistons in said cylinder displaceable in opposite direction from a normal position when the pump operates, a coupling lever pivoted between its ends and connected at its ends to said pistons, a spring for each piston, abutting at one end against the end of the pertaining cylinder, and having an abutment plate disposed between its free end and the piston, and movably arranged in the cylinder within a limited range to permit compression of the spring by its piston but to limit its expansion, so as to permit displacement of the piston freely beyond the expansion limit of the spring, a lever and gear connection between each cooperative element and one of said spring abutments, whereby when its pertaining spring is compressed each of said elements when engaged by the pilot element is displaced from normal position in the direction of response of the pilot element, for separating said two elements, and for returning the disengaged cooperative element to normal position when the pertaining piston returns to normal position, and a fluid by-pass between said cylinders for permitting the return of said pistons to normal position and a valve in said by-pass, controlled by the movement of said two armed level for controlling said by-pass to retard the return of said cooperative elements to normal position.

10. In a control system for controlling the movement of objects in two directions through power circuits, in combination with a pilot element responsive in two directions to the requirements for control, and being rotatable on an axis, and two cooperating elements, one for each control direction, and means for energizing the power circuit by engagement between the pilot element and one or the other of said cooperating elements according to the desired direction of movement of the object when its control is required, of a closed auxiliary fluid circulating system and a pump therefor, operable simultaneously with said object, for circulating fluid in one or the other direction in accordance with the direction of movement of said object, a pair of hydraulic servometer cylinders connected to the two sides of said pump, and pistons in said cylinders displaceable in opposite direction from a normal position when the pump operates, a mechanical coupling element between said pistons, a gear segment geared to said cooperating contact elements for moving the latter along the pilot element path, and having a lever connection with said pistons so that upon movement of the pistons from normal position, the cooperative element engaged by the pilot element is displaced from normal position in the direction of the pilot element response, to disengage it from the pilot element, said segment having its rotary axis movably disposed around the pilot axis, for adjusting the pilot system to various normal positions, and a spring element connected to each piston and tensioned by the displacement of said pistons from normal position and tending to return said pistons to normal position, whereby said displaced cooperative element when disengaged from the pilot element is returned to normal position, and a fluid by-pass between said cylinders for permitting the return of said pistons to normal position, and means controlled by the operation of said piston coupling element for controlling said by-pass for retarding said return.

11. In a control system for controlling the movement of objects in two directions through power circuits, in combination with a pilot element responsive in two directions to the requirements for control, and being rotatable on an axis, and two cooperating elements, one for each control direction, and means for energizing the power circuit by engagement between the pilot element and one or the other of said cooperating elements according to the desired direction of movement of the object when its control is required, of a closed auxiliary fluid circulating system and a pump therefor, operable simultaneously with said object, for circulating fluid in one or the other direction in accordance with the direction of movement of said object, a pair of hydraulic servomotor cylinders connected to the two sides of said pump, and pistons in said cylinders displaceable in opposite direction from a normal position when the pump operates, a mechanical coupling element between said pistons, a gear segment geared to said cooperating contact elements for moving the latter along the pilot element path, and having a lever connection with said pistons so that upon movement of the pistons from normal position, the cooperative element engaged by the pilot element is displaced from normal position in the direction of the pilot element response to disengage from the pilot element, an adjustable arm pivoted in the rotary axis of the pilot element and serving as a pivotal support for said segment, whereby the latter may be adjusted in different radial positions around the pilot axis for adjusting the pilot system to various normal positions, and a spring element connected to each piston and tensioned by the displacement of said pistons from normal position and tending to return said pistons to normal position, whereby said displaced cooperative element when disengaged from the pilot element is returned to normal position, and a fluid by-pass between said cylinders for permitting the return of said pistons to normal position, and means controlled by the operation of said piston coupling element for controlling said by-pass for retarding said return.

12. In a control system for controlling the movement of objects in two directions through power circuits, in combination with a pilot element rotatable on an axis and deflectable in one or the other direction from a normal position according to the control direction required for said object, and two cooperative elements disposed on either side of said pilot element and individually engageable by the latter in accordance with the control direction required, and means for energizing the power circuit by engagement between said pilot element and one of said cooperating elements to move the object in the desired direction when its control is required, of a closed auxiliary fluid circulating system and a pump therefor operable simultaneously with said object, for circulating fluid in one or the other direction in accordance with the direction of movement of said object, a pair of hydraulic servometer cylinders connected to the two sides of said pump, and pistons in said cylinder displaceable in opposite direction from a normal position when the pump operates, a two-armed lever pivoted between its ends and connected at its ends to said pistons, a spring for each piston operatively connected with it to permit the displacement of said piston from normal position freely in one direction but to exert its spring power against the displacement in the other direction, a lever and gear connection between each cooperative element and one of said springs whereby each of said elements is displaced from normal position when its pertaining spring is compressed, for moving said element, when engaged by the pilot element, away from the latter, and for returning said disengaged element to normal position when the pertaining piston returns to normal position, and means for rotatably adjusting both of said co-operative element gear connections around the pilot element axis for adjusting the pilot system to various normal positions, and a fluid by-pass between said cylinders for permitting the return of said pistons to normal position and a valve in said by-pass, controlled by the movement of said two-armed lever for controlling said by-pass to retard the return of said cooperative elements to normal position.

13. In a control system for controlling the movement of objects in two directions through an auxiliary power system, in combination with a pilot element, responsive to the control direction required for said object, and movable in opposite directions from a normal position according to the control direction required, and two cooperative elements disposed on either side of said pilot element and individually engageable by the latter in accordance with the control direction required, and means responsive to such engagement for actuating the auxiliary power system in the required direction, means for moving the engaged cooperative element to follow the response direction of the pilot element, to disengage said two elements, means for returning said cooperative element to normal position after the disengagement, and means for synchronizing said return movement with the return movement of the pilot element to normal position, to prevent re-engagement between said two elements.

In testimony whereof we affix our signatures.

WERNER PONTOW.
WILHELM ABENDROTH.
GÜNTHER SCHROEDER.
KARL A. MAYR.